UNITED STATES PATENT OFFICE.

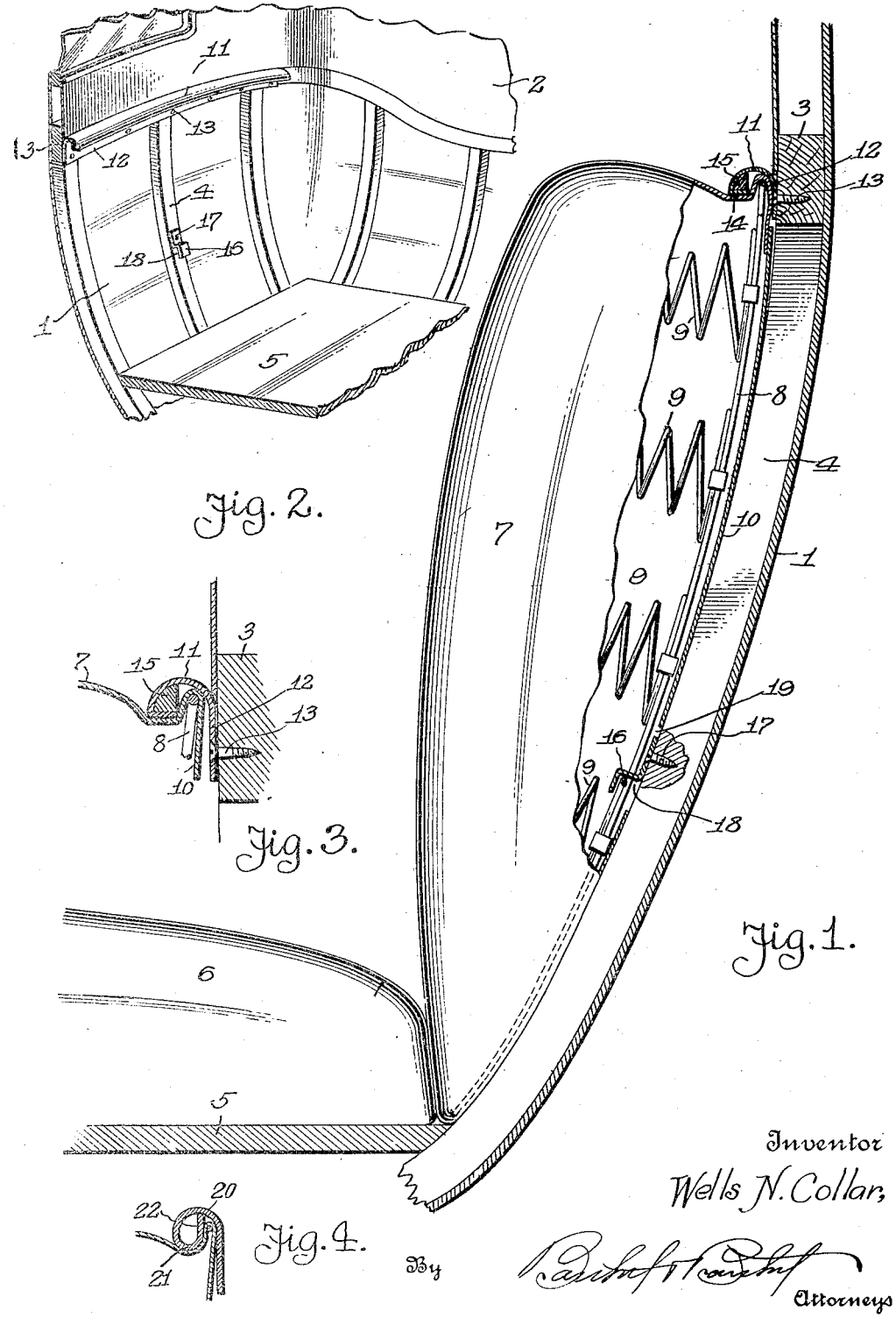

WELLS N. COLLAR, OF DETROIT, MICHIGAN.

UPHOLSTERY-FASTENING MEANS.

1,340,475. Specification of Letters Patent. Patented May 18, 1920.

Application filed January 10, 1920. Serial No. 350,588.

*To all whom it may concern:*

Be it known that I, WELLS N. COLLAR, a citizen of the United States of America, residing at Detroit, in the county of Wayne and State of Michigan, have invented certain new and useful Improvements in Upholstery-Fastening Means, of which the following is a specification, reference being had therein to the accompanying drawings.

This invention relates to upholstery fastening means, and has special reference to holding means for seat, back, side and other cushioning bodies for furniture, automobiles and other vehicles, the fastening means being of such construction that it may be shaped and suitably located for holding cushions or similar bodies on any support.

The objects of my invention are, first, to provide upholstery fastening means that may be advantageously used in connection with an automobile body for detachably holding cushions in engagement therewith, second, to provide detachable upholstery for an automobile body which will permit of the body being completely finished before the upholstery is installed and with the upholstery detachable it is possible to easily clean the interior of the body as well as the upholstery; third, to provide upholstery fastening means that will permit of upholstery being easily and quickly sprung into position so as not to become accidentally displaced and this is accomplished without resorting to any fastening means which would require the use of tools; fourth, to provide the fastening means wherein a portion is invisible and an exposed portion serves as a molding or finishing strip in connection with the supports of the upholstery, and fifth, to provide molding that may be used on any automobile body for holding upholstery.

The above and other objects are attained by a simple, durable and inexpensive mechanical construction, that will be hereinafter considered and then claimed, and reference will now be had to the drawing, wherein—

Figure 1 is a vertical sectional view of a portion of an automobile body provided with a back cushion retained in place by fastening means in accordance with my invention;

Fig. 2 is a perspective view of a portion of the automobile body showing the fastening means devoid of a cushion;

Fig. 3 is an enlarged cross sectional view of the molding, and

Fig. 4 is a cross sectional view of a modified form of molding.

In the drawing, the reference numeral 1 denotes, by the way of an example, an automobile body having a closed top 2 which meets the body 1 at a rail 3 supported by body frames 4 and these body frames determine the shape of the body 1 and have a support 5 for a seat cushion 6.

7 denotes a back cushion which includes a resilient frame 8, ordinarily made of wire, which provides an anchor for the inner convolutions of cushioning springs 9 employed to maintain the shape of the cushion 7 and lend cushioning qualities thereto. The cover on the cushion 7 has its edges trained over the edges of the resilient frame 8 and connected to a back cover 10, said back cover coöperating with the cushion cover in providing an inclosure for the body of the cushion.

11 denotes an overhanging metallic molding which has a vertical flange 12 connected by screws 13 or other fastening means to the rail 3, and this molding may extend throughout the length of the rail 3 or simply be located at such places where it is desired to have the cushion 7 held against accidental displacement.

The molding 11 has a longitudinal inturned support 14 and between this support and the body of the molding is a filler 15, which has the rear wall thereof in parallelism with the vertical flange 12 of the molding so as to coöperate therewith in providing a longitudinal groove having its bottom open so as to receive the upper rear edge of the cushion 7. The molding may be considered substantially semi-cylindrical with a quarter filler.

On one or more of the body frames 4, intermediate the rail 3 and the seat support 5, are clips 16 secured to the frames 4 by screws 17 or other fastening means, said clips being substantially Z-shaped so that the ends thereof will coöperate with the frames 4 in providing sockets 18 to receive the inner convolutions of the springs 9 or portions of the resilient frame 8. As shown in Fig. 1, the back cover 10 has openings 19 providing clearance for the clips 16 and prior to placing the seat cushion 6 in position the back cushion 7 can be placed under the clips 16 so that spring convolutions or portions of the frame 8 will extend under the clips 16 and prevent vertical displacement of the back cushion. With the lower portion of the back cushion held by the clips 16 the upper portion of the cushion extending into the molding, the cushion can be sprung so that the resilient frame 8 will be more or less bowed or flexed to permit of the upper edge of said frame being bound under the molding 11. The distance between the clips 16 and the molding 11 is less than the depth of the cushion, consequently the cushion must be bowed or sprung so that it will engage the clips 16 and the molding, and it is the tendency of the frame 8 to straighten out or assume a natural shape that retains the cushion in position. Of course the cushion 6 assists in this respect. The back cushion 7 is thus substantially held and it may be readily removed when it is desired to clean the same.

Considering the construction of the molding 11, it will be noted that the filler 15 prevents collapse of the inturned support 14 when the upper edge of the cushion 7 is being forced under the molding, that said filler assists in maintaining the convex shape of the molding, and that the flange 12 is of sufficient depth to permit of the screw 13 being easily installed. In some instance, the flange may be lateral or at an angle so that the molding may be mounted on a rail other than shown.

In Fig. 4 the molding 20 has the inturned support 21 thereof terminating in an inturned flange 22 and this form of molding may be used with or without a filler. Either form of molding may be covered or finished to harmonize with the upholstery and shaped to prevent cutting of the goods of a cushion.

One embodiment of my invention has been illustrated, but it is to be understood that the structural elements are susceptible to such variations and modifications as fall within the scope of the appended claims.

What I claim is:—

1. Upholstery fastening means adapted for holding a cushion having a resilient frame supporting springs, comprising clips extending into the cushion to anchor the lower portion thereof, and a molding under which the upper portion of the cushion is placed so that the resilient frame may be bowed relative to a plane connecting said molding and clips and by virtue of its resiliency produce tension of the frame against said clips and molding to hold the cushion in engagement therewith.

2. Upholstery fastening means as characterized in claim 1, wherein the molding has a support for a filler coöperating with said molding in forming a groove to receive the upper edge of the cushion.

3. Upholstery fastening means as characterized in claim 1, wherein the back of the cushion has openings to receive the clips so that said clips may engage either the frame or the springs supported thereby.

4. A molding for upholstery, comprising a semi-cylindrical body having an inturned support, a quarter filler on said support, and a depending flange extending below the plane of the inturned support and coöperating with said inturned support and said filler in providing a groove throughout the length of said molding.

5. As a new article of manufacture, a molding for upholstery comprising a body having a depending flange and an inturned flange with its edge terminating adjacent the depending flange to coöperate therewith in providing a groove throughout the length of said molding, the said depending flange of said body extending below the plane of the inturned flange.

In testimony whereof I affix my signature in the presence of two witnesses.

WELLS N. COLLAR.

Witnesses:
KARL H. BUTLER,
ANNA M. DORR.